United States Patent
Jin et al.

(10) Patent No.: US 10,788,243 B2
(45) Date of Patent: Sep. 29, 2020

(54) REFRIGERANT DISTRIBUTOR FOR ALUMINUM COILS

(71) Applicant: Advanced Distributor Products LLC, Grenada, MS (US)

(72) Inventors: Dae-Hyun Jin, Suwanee, GA (US); Timothy Orr, Dunwoody, GA (US); James Timbs, Winona, MS (US)

(73) Assignee: Advanced Distributor Products LLC, Grenada, MS (US)

( * ) Notice: Subject to any disclaimer, the term of this patent is extended or adjusted under 35 U.S.C. 154(b) by 111 days.

(21) Appl. No.: 15/250,004

(22) Filed: Aug. 29, 2016

(65) Prior Publication Data

US 2018/0058736 A1    Mar. 1, 2018

(51) Int. Cl.
| | | |
|---|---|---|
| *F25B 39/00* | (2006.01) | |
| *F16L 13/14* | (2006.01) | |
| *F28F 9/16* | (2006.01) | |
| *F28F 9/18* | (2006.01) | |
| *F28F 9/02* | (2006.01) | |
| *F28D 21/00* | (2006.01) | |
| *F25B 39/02* | (2006.01) | |

(52) U.S. Cl.
CPC .............. *F25B 39/00* (2013.01); *F16L 13/141* (2013.01); *F28F 9/0275* (2013.01); *F28F 9/162* (2013.01); *F28F 9/182* (2013.01); *F25B 39/028* (2013.01); *F28D 2021/0085* (2013.01); *F28F 2275/04* (2013.01); *F28F 2275/122* (2013.01)

(58) Field of Classification Search
CPC ... F25B 39/028; F28F 2275/122; F16L 13/14; F16L 13/141; F16L 13/143
See application file for complete search history.

(56) References Cited

U.S. PATENT DOCUMENTS

| | | | | |
|---|---|---|---|---|
| 2,110,430 A | * | 3/1938 | Swanson | F25B 39/028 137/109 |
| 2,121,558 A | * | 6/1938 | Coe | B21D 39/04 285/133.11 |
| 2,158,716 A | * | 5/1939 | Bergdoll | F25B 39/028 137/262 |
| 3,068,563 A | * | 12/1962 | Reverman | B21D 39/04 156/91 |
| 3,071,993 A | * | 1/1963 | Foster | B21D 39/04 72/126 |
| 3,343,252 A | * | 9/1967 | Reesor | F16L 13/141 29/458 |

(Continued)

FOREIGN PATENT DOCUMENTS

| | | | | |
|---|---|---|---|---|
| CH | | 297122 A * | 3/1954 | ............ F28F 9/16 |
| DE | | 2831832 A1 | 2/1979 | |
| WO | WO-2016/002280 A1 | | 1/2016 | |

*Primary Examiner* — Christopher R Zerphey
(74) *Attorney, Agent, or Firm* — Sheckleford, Bowen, McKinley & Norton, LLP

(57) ABSTRACT

A method and system are described for a refrigerant distributor, and for attaching the distributor tubes to an evaporator coil. A short tube can inserted into the bell end of a tube and the bell end can be crimped around the short tube to lock it into place. The short tube preferably has a bead or widened shaft around which to crimp the bell. The disclosure is particularly beneficial for aluminum based components because aluminum is more susceptible to blockages or leaking due to problems from brazing.

10 Claims, 6 Drawing Sheets

(56) References Cited

U.S. PATENT DOCUMENTS

| | | | | |
|---|---|---|---|---|
| 4,357,990 A | * | 11/1982 | Melnyk | F28F 9/26 165/150 |
| 4,430,868 A | * | 2/1984 | Kern | F25B 39/028 62/504 |
| 5,743,571 A | * | 4/1998 | Gaitros | F16L 13/141 285/382 |
| 2007/0046026 A1 | * | 3/2007 | Wells | F16L 13/143 285/382 |
| 2016/0047501 A1 | * | 2/2016 | Kawahara | B21D 39/04 285/382 |
| 2016/0362829 A1 | * | 12/2016 | Jung | D06F 58/206 |

* cited by examiner

REFRIGERANT DISTRIBUTOR FOR ALUMINUM COILS

TECHNICAL FIELD

The present disclosure is directed to evaporator coils and more particularly to refrigerant distributors for evaporator coils.

BACKGROUND OF THE INVENTION

Evaporator coils within heating and A/C systems are often made of aluminum or copper. Manufacturers usually try to construct heating and A/C systems with as much of the same material as possible. If an evaporator coil is made of aluminum then other pipes, inlets, outlets, and other components will be made of aluminum, where possible. Refrigerant distributors provide inlets to the evaporator coil. A refrigerant distributor usually comprises a threaded housing connected to a plurality of tubes.

BRIEF SUMMARY OF THE INVENTION

One embodiment of the present disclosure comprises a refrigerant distributor for use in an HVAC system comprising: a housing, the housing comprising a plurality of inlets and a plurality of outlets; a plurality of tubes, the plurality of tubes connected to the plurality of outlets at one end and comprising a plurality of bells at a distal end; and a plurality of short tubes, the plurality of short tubes inserted into the plurality of bell; wherein the plurality of bells has been crimped around the short tube.

Another embodiment of the present disclosure can comprise a refrigerant distributor tube for connecting a refrigerant distributor housing to an evaporator coil, the refrigerant distributor tube comprising: a first end configured to be coupled to a refrigerant distributor housing; a distal end comprising a bell; and a short tube inserted into the bell; wherein the bell has been crimped around the short tube.

Another embodiment of the present disclosure can comprise a method of constructing a refrigerant distributor comprising: providing a housing, the housing comprising a plurality of inlets and a plurality of outlets; attaching a plurality of tubes to the plurality of outlets; sizing out a distal end of the plurality of tubes to form a plurality of bells; inserting a plurality of short tubes into the plurality of bells; and crimping a portion of the plurality of bells about the plurality of short tubes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1A:
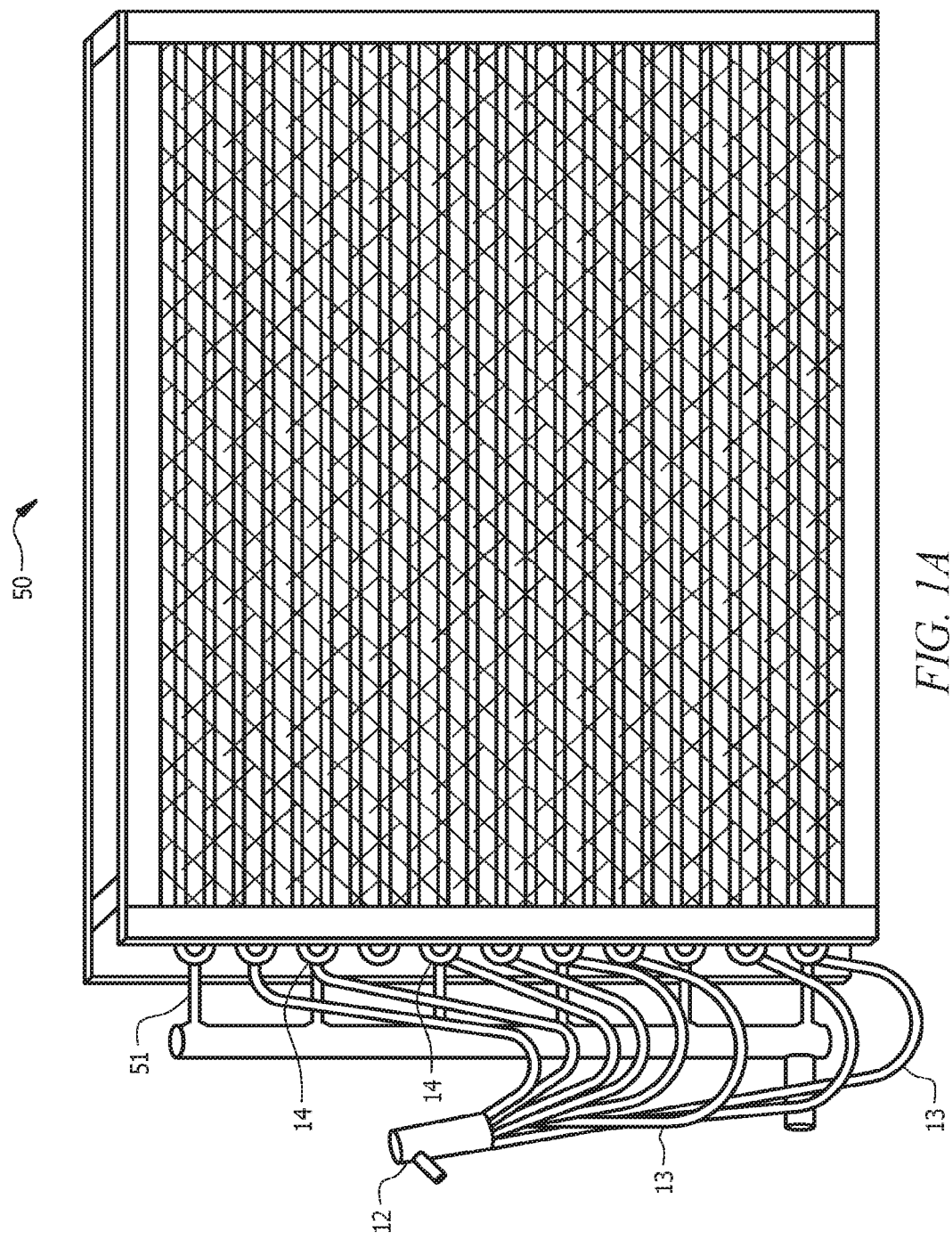
FIGS. 1A-1B show a diagram of a prior art refrigerant distributor and HVAC coil.
Figure 1B:
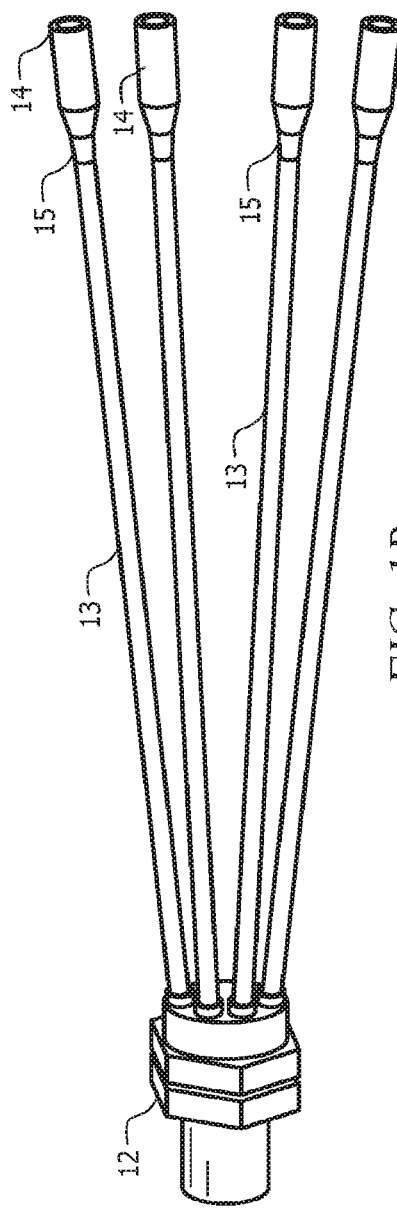

Evaporator coils in HVAC systems are typically made of copper or aluminum (though other materials can be used as well). Copper-based coils have been more popular previously, but more and more aluminum is being used. When an evaporator is copper, it has been preferred to use a copper refrigerant distributor. Refrigerant distributors 10, such as that seen in FIGS. 1A-1B, comprise a threaded housing 12 at one end and a plurality of tubes 13 at the other end which connect to the inlets 51 of an evaporator coil(s) 50. The tubes will have a bell-shaped end 14. The bell can either be formed by sizing out the tube 13 or by brazing the bell 14 onto the tube 13, such as at a brazing point 15. When the tubes 13 are attached to the inlets 51, brazing will be done again to attach bells 14 to the inlets 51. Multiple brazings are unproblematic when the distributor 10, tubes 13, and coil 50 are all made of copper. This is because the melting temperature of the brazing alloy is sufficiently lower than that of copper. However, this process is problematic when using aluminum-based distributors and coils. Aluminum's lower melting temperature has led to problems where the tube/bell/inlet breaks and begins to leak or block a refrigerant path. Using aluminum is especially problematic when sizing out the bell portion of a distributor tube. The sizing out process creates a thin material that is susceptible to problems during brazing. A process or system is needed by which aluminum can be more effectively integrated into distributors and coils.

Figure 2:
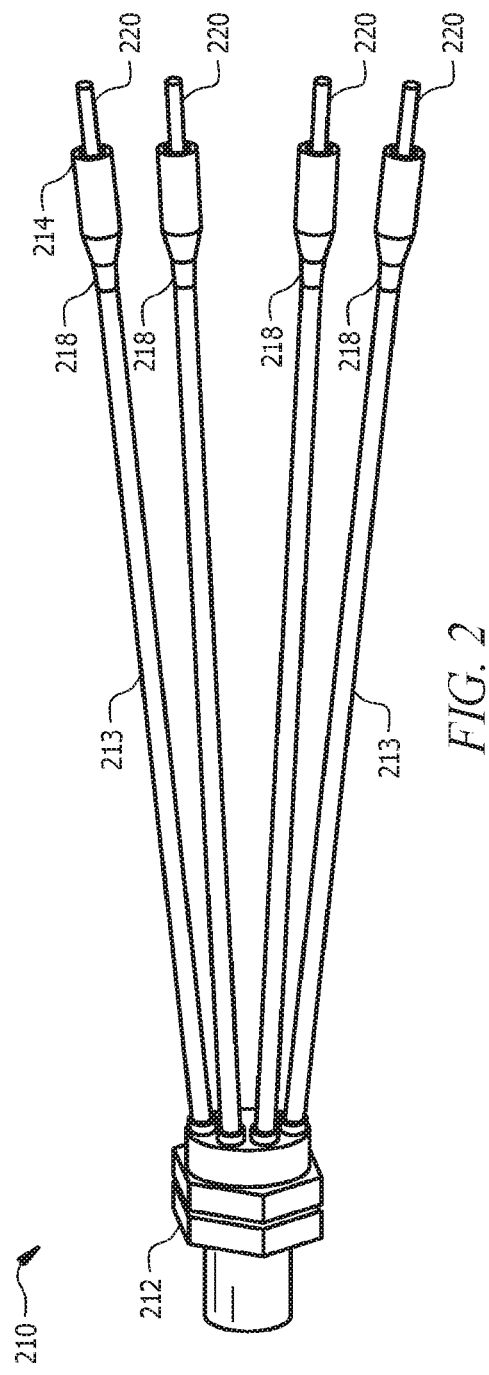
FIG. 2 shows a diagram of a refrigerant distributor under the present disclosure.

A refrigerant distributor under the present disclosure, such as in FIG. 2, can comprise a short tube 220 attached within a sized out bell 214 on a distributor tube 213, the short tube 220 being attached to the distributor tube 213 by a crimping process at the bell 214. The bell 214 can then be brazed onto an HVAC coil. This is advantageous over the prior art because the system undergoes only one brazing process, instead of two brazing processes. The prior art used brazing to attach a bell to a tube, and a second brazing process to attach the bell to a heat exchanger/coil. Furthermore, short tube 220 provides extra structural reinforcement between the refrigerant distributor and the coil (or other HVAC component).

The possible embodiment in FIG. 2 comprises a refrigerant distributor 210. Refrigerant distributor 210 comprises a threaded housing 212, tubes 213, bells 214, and short tubes 220. Bells 214 comprise a crimping section 218. The unseen ends of short tubes 220 are attached within bells 214 via crimping at section 218. In a preferred embodiment short tubes 220 are similarly sized to tubes 213 but are separate tubes.

Figure 3A:
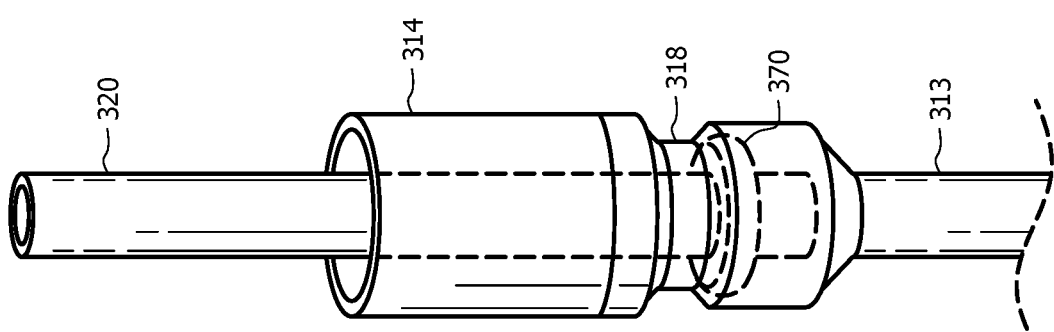
FIGS. 3A-3C show diagrams of refrigerant distributor tubes under the present disclosure.
Figure 3B:
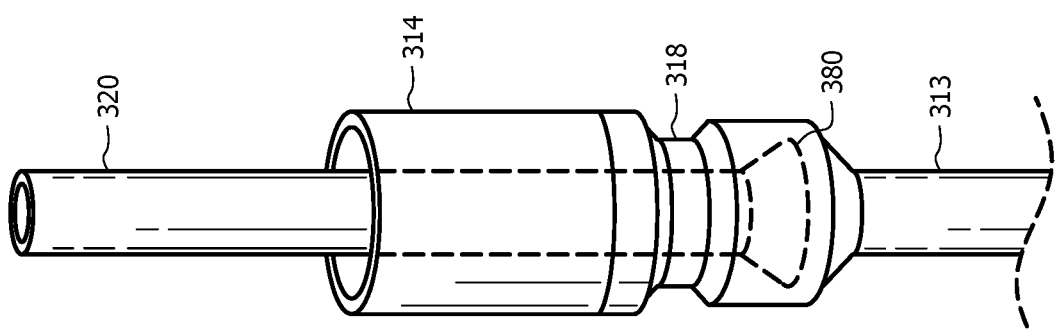
Figure 3C:
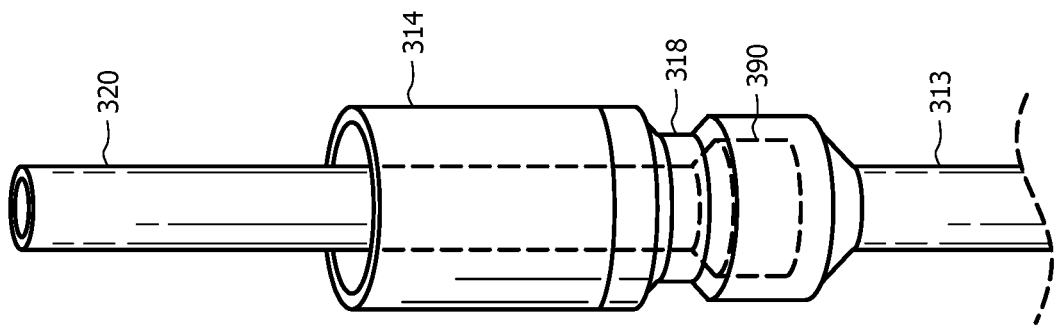

Possible embodiments of bells and short tubes under the present disclosure can be seen in FIGS. 3A to 3C. Tubes 313 have undergone a sizing out process to create a bell-shaped end 314. Short tubes 320 have been inserted into bells 314. Each embodiment has a different shape pattern. FIG. 3A shows a short tube 320 with a bead 370. FIG. 3B shows a short tube 320 with a flare 380. FIG. 3C shows a short tube 320 with a sized end 390. Other patterns or shapes can be used, as long as a surface is provided against which crimping can provide a tight fit. Crimping 318 is completed after insertion of the short tube 314. After construction, the distributor tubes 313 can then be brazed onto the inlets of an evaporator coil(s). The extra strength provided by the short tube 320, and its position within the bell 314, allows the tube 313 to withstand the temperatures of a brazing process. A preferred embodiment of tubes 313 and short tubes 320 comprises aluminum parts. However, any material can be used that would be appropriate for use in evaporator coils and distributor tubes.

Figure 4:
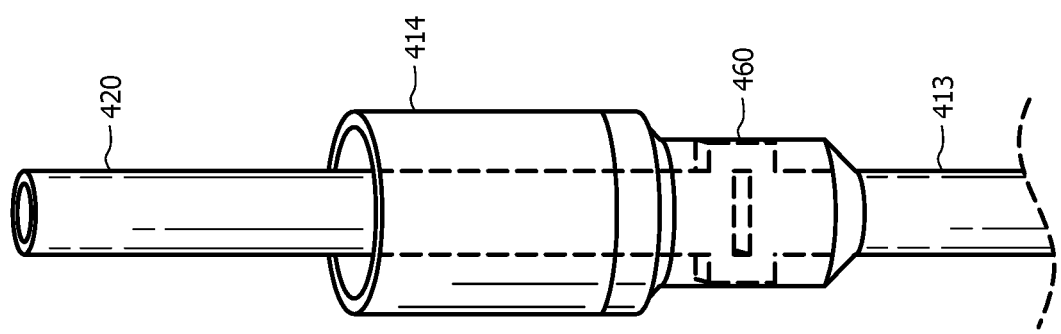
FIG. 4 shows a diagram of a refrigerant distributor tube under the present disclosure.

An alternative embodiment of the distributor tube under the present disclosure can be seen in FIG. 4. In this embodiment, tube 413 has a sized-out bell 414 and a short tube 420 inserted therein. Short tube 420 is brazed at brazing ring 460 to the inside of bell 414. An embodiment such as this would generally not be used for aluminum components, but would be useful for copper or stainless steel embodiments.

Whatever material (e.g. steel, copper, aluminum) is used for an evaporator coil, generally the same material will be used for the distributor tubes. During use, coils and tubes can degrade and corrode. Typically, users and manufacturers try to avoid the mixing of different materials from corrosion (e.g. aluminum and copper). Instead, if there is corrosion it is desirable to have just one material.

As described, the bells 314 and 414 in FIGS. 3 and 4 have been formed by a sizing out process. That is a preferred embodiment. Other embodiments can use brazing, soldering, adhesive, or any appropriate mechanism.

Figure 5:
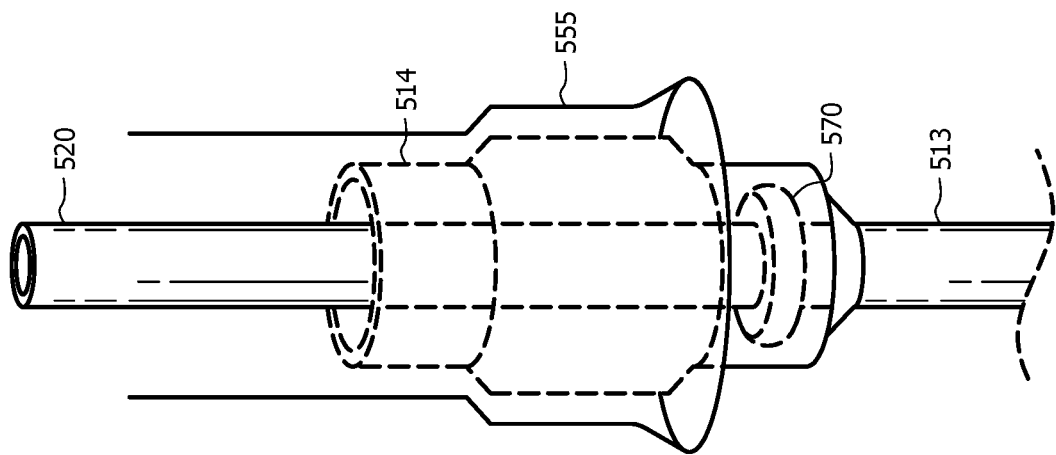
FIG. 5 shows a diagram of a refrigerant distributor tube under the present disclosure.

FIG. 5 displays another embodiment under the present disclosure. In this embodiment tube 513 has a bell 514 and a short tube 520 that has been crimped into placed around bead 570. In addition, a shell 555 is provided that extends around the bell 514 and short tube 520. The shell 555 can be brazed onto the coil inlet or can be crimped around the bell 514 and/or short tube 520. Crimping or brazing of the shell 555 can be done on either side of the bell 514, or both sides.

Figure 6:
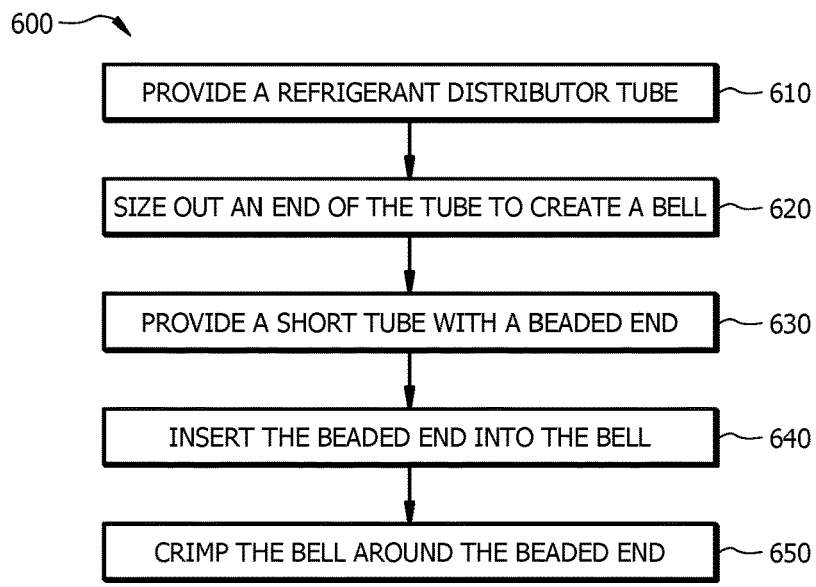
FIG. 6 shows a flow-chart diagram of a method embodiment under the present disclosure.

FIG. 6 displays a possible method embodiment 600 under the present disclosure for constructing a brazing resistant distributor tube. At 610, a refrigerant distributor tube is provided. At 620, an end of the tube is sized out to create a bell. At 630, a short tube is provided with a beaded end. At 640, the beaded end is inserted into the bell. At 650, the bell is crimped around the beaded end to seal the beaded end into the bell.

Figure 7:
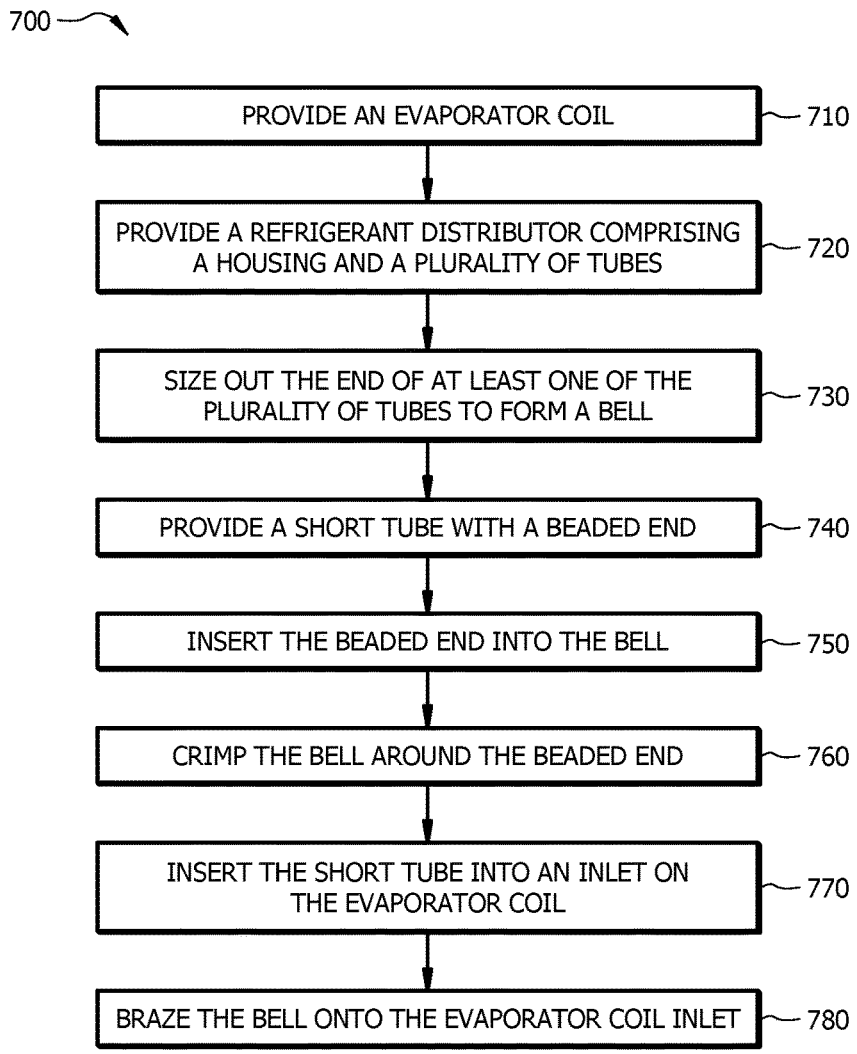
FIG. 7 shows a flow-chart diagram of a method embodiment under the present disclosure.

FIG. 7 displays another possible method embodiment 700 under the present disclosure for constructing an HVAC system. At 710, an evaporator coil is provided. At 720, a refrigerant distributor is provided comprising a housing and a plurality of tubes. At 730, an end of at least one of the plurality of tubes is sized out to form a bell. At 740, a short tube is provided with a beaded end. At 750, the beaded end is inserted into the bell. At 760, the bell is crimped around the beaded end. At 770, the short tube is inserted into an inlet on the evaporator coil. At 780, the bell is brazed onto the evaporator coil inlet.

Figure 8:
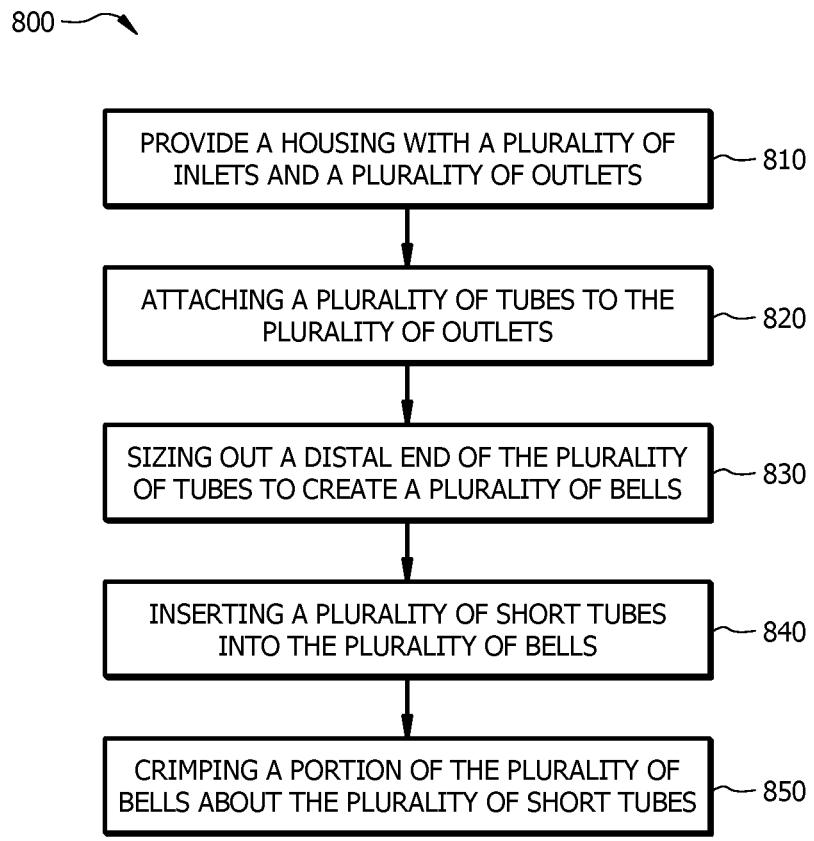
FIG. 8 shows a flow-chart diagram of a method embodiment under the present disclosure.

FIG. 8 displays another possible method embodiment 800 under the present disclosure, for constructing a refrigerant distributor. At 810, a housing is provided with a plurality of inlets and a plurality of outlets. At 820, a plurality of tubes is attached to the plurality of outlets. At 830, a distal end of the plurality of tubes is sized out to create a plurality of bells. At 840, a plurality of short tubes is inserted into the plurality of bells. At 850, a portion of the plurality of bells is crimped about the plurality of short tubes.

Although the present disclosure has been described with regard to aluminum coils and tubes, the same principles can be applied to components of other materials as well. Furthermore, the principles can be applied to connections between various components within an HVAC system, not just between a refrigerant distributor and an evaporator coil. Connections to condenser, compressors, coils, and other components can take advantage of the present disclosure.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A refrigerant distributor for use in an HVAC system comprising:
   a housing, the housing comprising an inlet and a plurality of outlets;
   a plurality of distributor tubes, the plurality of distributor tubes connected to the plurality of outlets of the housing at one end and comprising a plurality of bells at distal ends;
   a plurality of tubes inserted into the plurality of bells;
   wherein each bell of the plurality of bells comprises a crimping section, the crimping section being interposed between a first cylindrically-shaped section and a second cylindrically-shaped section of the plurality of bells;
   wherein the second cylindrically-shaped section comprises a first portion and a second portion, the second portion having a diameter smaller than the first portion and decreasing in diameter linearly to an end thereof;
   a plurality of shells, wherein each shell of the plurality of shells comprises a first outer diameter, a second outer diameter, and a third outer diameter, wherein the third outer diameter is increased relative to the second outer diameter and the second outer diameter is increased relative to the first outer diameter, wherein the third outer diameter terminates at an end of the shell and comprises a largest outer diameter of the shell, wherein each shell of the plurality of shells extends around each bell of the plurality of bells and each tube of the plurality of tubes;

wherein first ends of the plurality of tubes are attached within the plurality of bells via crimping at the crimping section around the enlarged region; and wherein the plurality of bells are attached to inlets of an evaporator coil.

2. The refrigerant distributor of claim 1 wherein the refrigerant distributor comprises aluminum.

3. The refrigerant distributor of claim 1 wherein the plurality of bells are formed by sizing out the plurality of distributor tubes.

4. The refrigerant distributor of claim 1 wherein the plurality of bells are brazed onto the plurality of distributor tubes.

5. A refrigerant distributor tube for connecting a refrigerant distributor housing to an evaporator coil, the refrigerant distributor tube comprising:
　a first end configured to be coupled to the refrigerant distributor housing;
　a distal end comprising a bell;
　a tube inserted into the bell;
　wherein the bell comprises a crimping section, the crimping section being interposed between a first cylindrically-shaped section and a second cylindrically-shaped section of the bell;
　wherein the second cylindrically-shaped section comprises a first portion and a second portion, the second portion having a diameter smaller than the first portion and decreasing in diameter linearly to an end thereof;
　a shell comprising a first outer diameter, a second outer diameter, and a third outer diameter, wherein the third outer diameter is increased relative to the second outer diameter and the second outer diameter is increased relative to the first outer diameter, wherein the third outer diameter terminates at an end of the shell and comprises a largest outer diameter of the shell, wherein the shell extends around the bell and the tube;
　wherein the refrigerant distributor tube is attached within the bell via crimping at the crimping section around the enlarged region; and
　wherein the bell is attached to an inlet of the evaporator coil.

6. The refrigerant distributor tube of claim 5 wherein the refrigerant distributor tube comprises aluminum.

7. The refrigerant distributor tube of claim 5 wherein the bell is formed by sizing out the refrigerant distributor tube.

8. The refrigerant distributor tube of claim 5 wherein the bell is brazed onto the refrigerant distributor tube.

9. A method of constructing a refrigerant distributor comprising:
　providing a housing, the housing comprising an inlet and a plurality of outlets;
　attaching a plurality of distributor tubes to the plurality of outlets;
　sizing out distal ends of the plurality of distributor tubes to form a plurality of bells;
　inserting a plurality of tubes into the plurality of bells, wherein each bell of the plurality of bells comprises a crimping section, the crimping section being interposed between a first cylindrically-shaped section and a second cylindrically-shaped section of the plurality of bells, wherein the second cylindrically-shaped section comprises a first portion and a second portion, the second portion having a diameter smaller than the first portion and decreasing in diameter linearly to an end thereof, and wherein first ends of the plurality of tubes are attached within the plurality of bells via crimping at the crimping section around the enlarged region;
　attaching a plurality of shells to at least one of the plurality of bells and the plurality of tubes, wherein each shell of the plurality of shells comprises a first outer diameter, a second outer diameter, and a third outer diameter, wherein the third outer diameter is increased relative to the second outer diameter and the second outer diameter is increased relative to the first outer diameter, wherein the third outer diameter terminates at an end of the shell and comprises a largest outer diameter of the shell, wherein each shell of the plurality of shells extends around each bell of the plurality of bells and each tube of the plurality of tubes; and
　attaching the plurality of bells to inlets of an evaporator coil.

10. The method of claim 9 wherein the housing, the plurality of distributor tubes, and the plurality of tubes comprise aluminum.

* * * * *